United States Patent [19]
Miller

[11] Patent Number: 6,159,125
[45] Date of Patent: Dec. 12, 2000

[54] ROLLING ELEMENT TRANSMISSION

[75] Inventor: Gerald Miller, Mission Viejo, Calif.

[73] Assignee: John Zabsky, Santa Ana, Calif.

[21] Appl. No.: 09/223,329

[22] Filed: Dec. 30, 1998

[51] Int. Cl.$^7$ ...................................................... F16H 1/34
[52] U.S. Cl. .......................................... 475/196; 74/216.3
[58] Field of Search ................................... 74/216.3, 415, 74/465; 475/183, 196

[56] References Cited

U.S. PATENT DOCUMENTS

| 2,901,914 | 9/1959 | Preston ................................... 74/216.3 |
| 3,491,607 | 1/1970 | Fisher ..................................... 74/216.3 |

Primary Examiner—Sherry Estremsky
Attorney, Agent, or Firm—Leon D. Rosen

[57] ABSTRACT

A transmission includes a guideway (20) formed between a pair of tracks (22, 24) extending in a closed loop (21), and an endless train of rolling elements (X, Y, B) extending along the closed loop and rolling on the tracks and on each other. An input shaft (10) turns an input wheel (32) that carries a plurality of input wheel rollers (34), with the input wheel rollers pushing selected ones (X) of the rolling elements to move the train of rolling elements along the closed loop. An output shaft (12) is turned by an output wheel (40), with the output wheel carrying a plurality of output wheel rollers (36) that are in the path of the rolling elements to be moved by them. The rolling elements include rollers (X, Y) that roll along one track (24) and balls (B) lying between the rollers and rolling on the other track (22) and against the rollers.

5 Claims, 6 Drawing Sheets

ROLLING ELEMENT TRANSMISSION

BACKGROUND OF THE INVENTION

There are many mechanisms for transmitting power between input and output shafts, including belts, gears, and hydraulic fluid. A new transmission which can transmit power between shafts or which can move individual elements along predetermined endless loops, would have utility in many applications.

SUMMARY OF THE INVENTION

In accordance with one embodiment of the invention, a transmission is provided for transmitting power along a closed loop. The transmission includes a frame with a pair of largely parallel tracks extending in closed loop paths and forming a gap extending in a closed loop between them. A train of rolling elements lie along the closed loop, including first elements that roll along the first track and second elements that roll against the second track and against the first elements, so the rolling elements can push one another along the closed loop. A power input includes at least one pusher that pushes particular ones of the rolling elements to push the train of elements along the loop.

The power input can include an input shaft that turns a wheel that, in turn, carries a plurality of wheel rollers. The wheel rollers are positioned to engage selected ones of the rolling elements as they move along a section of a circle. A power output shaft similarly includes a plurality of output wheel rollers pivotally mounted on an output wheel that is connected to an output shaft.

The rolling elements can include rollers with curved concave middles or grooves that roll along a projection of a first track, and balls that roll against a recess of a concave second track. The balls project into the concave middles of the rollers and roll thereon. Some of the roller elements have projecting ends that can be engaged by the wheel elements so the roller elements can be pushed by the input wheel rollers and can, in turn, push the output wheel rollers.

There are applications where the movement of the endless train of rolling elements serves a useful purpose, even without the rolling elements driving an output shaft. This can occur where some of the rolling elements carry mixer blades for mixing fluid as the roller elements move along the closed loop. Another application is where the rolling elements carry decorations to provide part of a dynamic display.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
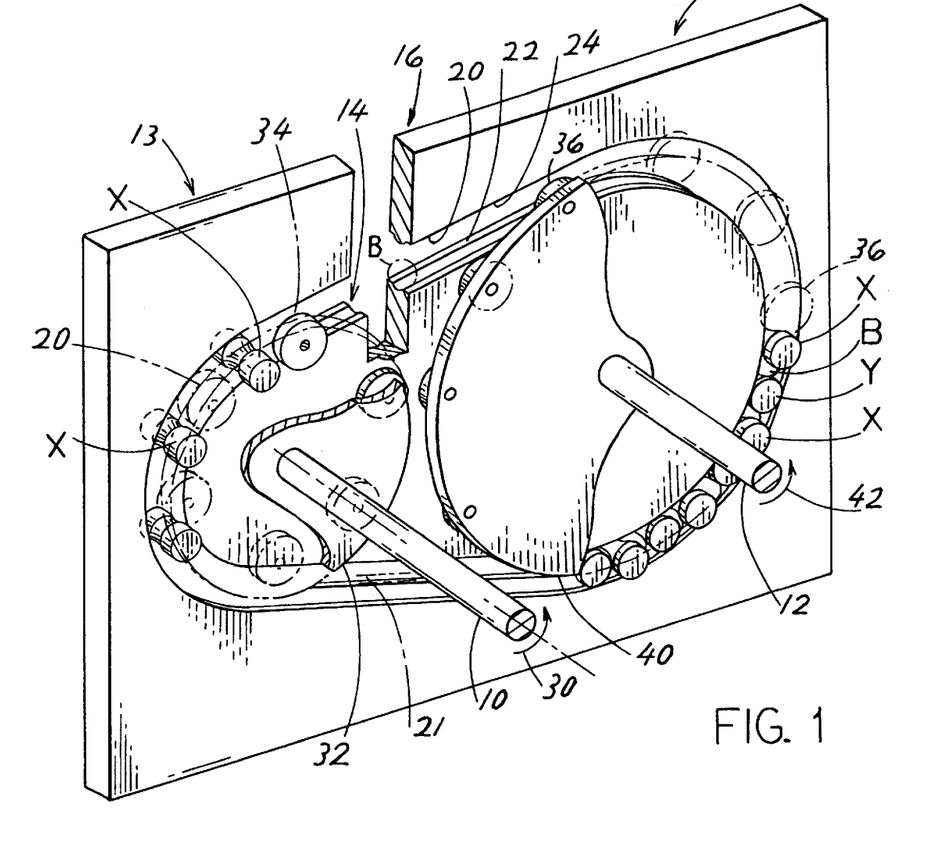
FIG. 1 is a partially sectional isometric view of a transmission constructed in accordance with one embodiment of the present invention.

FIG. 1 illustrates a transmission 11 that can transmit power from an input shaft 10 to an output shaft 12. The transmission includes a frame 13 forming inner and outer frame parts 14, 16 that form a gap or guideway 20 between them, with the guideway extending in an endless or closed loop 21. The guideway has first and second or inner and outer tracks 22, 24 formed respectively by the inner and outer frames. A plurality of track-guided rolling elements of three types X, Y, B move along the guideway to transmit power between the shafts by compression of the rolling elements. When the input shaft 10 is turned in the direction 30, it turns an input wheel 32 that carries six input wheel elements 34 in the form of wheel rollers. The input wheel rollers 34 each push against main roller elements X to push them along the guideway. Thus, the input wheel rollers serve as pushers to push the rolling elements. It would be possible to use a linear pusher, although a wheel is preferred. Each pair of main roller elements X are separated by a minor roller element Y and two balls B. All of the rolling elements X, Y and B are loose in that they are not fixed to any other elements, although they are confined to movement along the closed loop 21 and roll against the corresponding tracks of the guideway.

Near the output shaft 12, the main roller elements X move along the guideway and push against output wheel elements or output wheel rollers 36. The output wheel rollers 36 are rotatably mounted on an output wheel 40 that is fixed to the output shaft 12. The movement of the rolling elements causes the output wheel 40 to turn in direction 42. Accordingly, power is transmitted from the input shaft 10 to the output shaft 12 through the train of rolling elements X, Y, and B.

Figure 2:
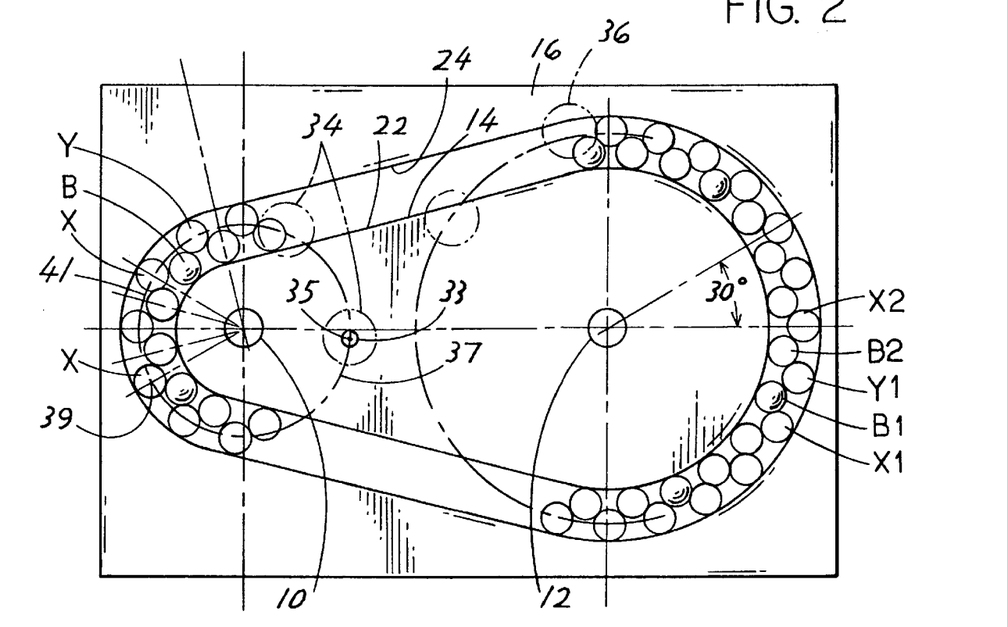
FIG. 2 is a side elevation view of the transmission of FIG. 1, with the input and output wheel assemblies shown in phantom lines.

FIG. 2 shows the frame parts 14, 16 and the track-guided elements X, Y and B. It is noted that the elements B, which are each in the form of a ball, all roll along the second or inner track 22. The major and minor elements X, Y are rollers that roll against the second track or outer track 24. It can be seen that each pair of adjacent main roller elements such as X1 and X2 in FIG. 2 are separated by one minor roller element Y1 which lies halfway between them, and by two balls B1 and B2. The two balls B1, B2 and the one minor roller Y1 serve to maintain a considerable separation between adjacent major roller elements X1, X2, so that the wheel rollers 34, 36 on the input and output wheels can fit between pairs of adjacent major rollers X.

FIG. 2 shows that the input wheel elements have shafts 33 with axes 35 that move in a circle 37. The roller elements X, Y turn about axes of rotation 39 that move in a path portion 41 that is part of the circle. The input wheel element axes 35 overlap the rolling elements when viewed along the input wheel axes 35 as in FIG. 2.

Figure 3:
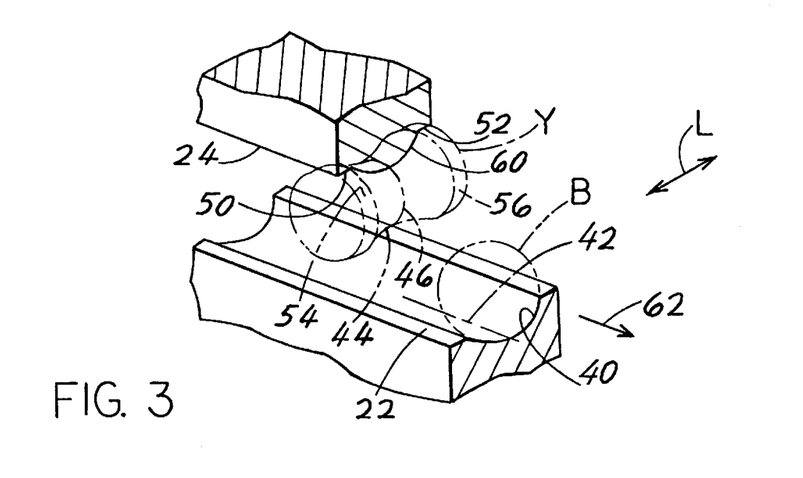
FIG. 3 is a sectional isometric view of a portion of the mechanism of FIG. 1, showing the two tracks and two of the rolling elements that move along the track.

FIG. 3 shows the shape of the inner and outer tracks 22, 24 in relation to each ball element B and each minor roller element Y. The inner track 22 has a recess 40 of slightly greater radius of curvature than the radius of the ball element B, to encourage the ball element to roll along the center line 42 of the inner track. The roller element Y has a groove 44 of rounded cross section to closely receive the ball B. The groove 44 preferably has a slightly greater radius of curvarture than the ball, so the ball rolls against the center line 46 of the roller element groove. The minor roller element Y has cylindrical opposite sides 54, 56 spaced in a lateral direction L, that lie close to flat aligned opposite sides 50, 52 of the outer track 24. The roller element sides 54, 56 do not roll on the track sides 50, 52, but the track sides can minimize wobble of the rollers element. The outer track has an inward projection 60 that keeps the roller centered between the track sides 50, 52. The roller rolls on the middle of the projection 60. When the elements move in the direction 62, the ball B rolls clockwise as shown in FIG. 3, while the minor roller element Y rolls counterclockwise. As a result, the two rolling elements B, Y can roll on one another with very little or no sliding friction and only rolling friction.

Figure 4:
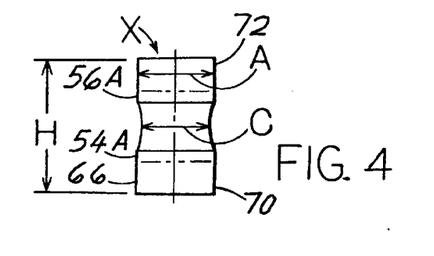
FIG. 4 is a side elevation view of a main roller element of the transmission of FIG. 1.
Figure 5:
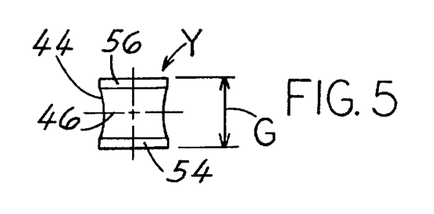
FIG. 5 is a side elevation view of a secondary roller element of the transmission of FIG. 1.
Figure 6:
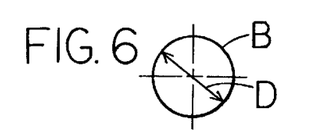
FIG. 6 is a side elevation view of a ball element of the transmission of FIG. 1.

FIGS. 4, 5 and 6 show the shape of each main roller element X, minor roller element Y, and ball B. It can be seen that the two roller elements X, Y are identical, except that the sides 70, 72 of the main roller elements X are longer than the sides 54, 56 of the minor roller elements Y. This construction is used so that a considerably length 66 of each main element side 70, 72 forms a push portion that projects from the guideway and can be engaged by input or output rollers on the input and output wheels, as shown in FIG. 1. Each main element X has track-engaging side parts 54A, 56A which do not roll on a corresponding track side but can minimize wobble of the roller element.

Figure 7:
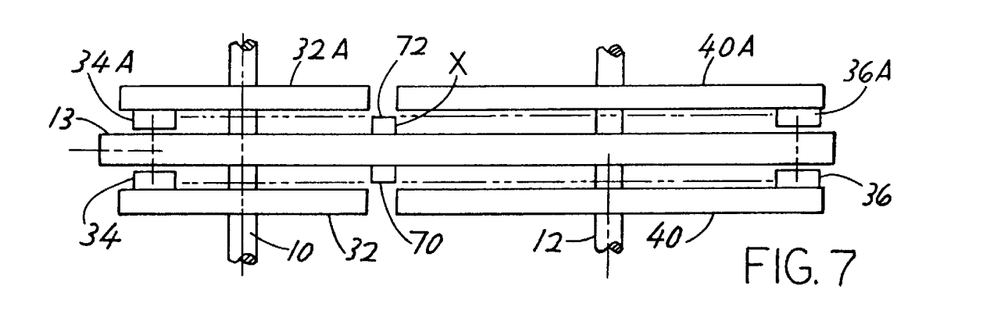
FIG. 7 is a top view of the transmission of FIG. 2.

FIG. 7 shows two input wheels, 32, 32A that lie on opposite sides of the frame 13 and that are each attached to the input shaft 10. Each input wheel 32, 32A carries six wheel rollers 34, 34A. Similarly, the output shaft 12 carries two output wheels 40, 40A that each carries a group of rotatably mounted output wheel rollers 36, 36A. The long sides 70, 72 of each main roller element X results in these sides engaging the two sets of rollers 34, 34A of the input wheels and the rollers 40, 40A of the output wheels.

Figure 8:
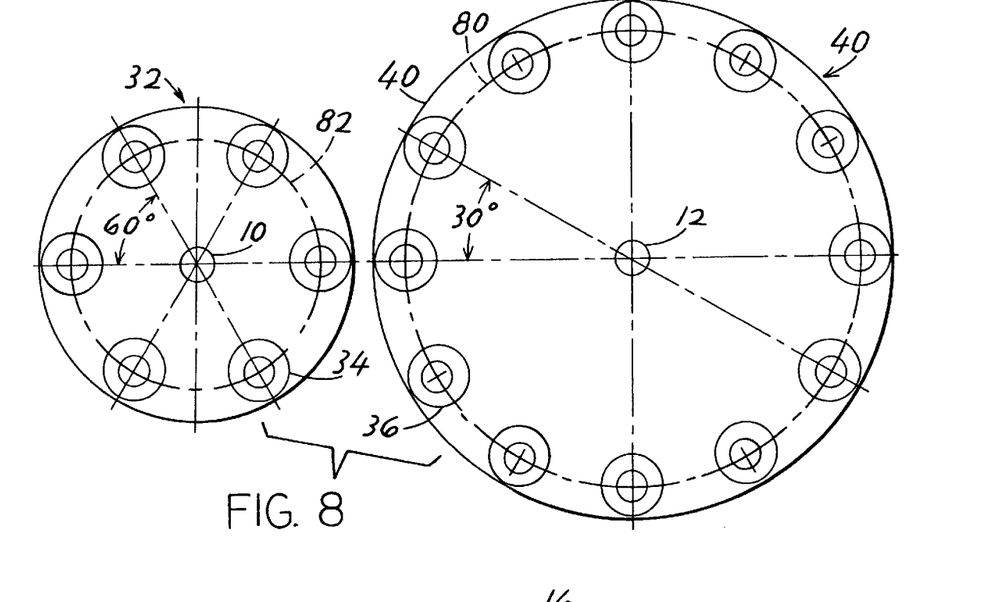
FIG. 8 is a side elevation view of only the input and output wheel assemblies of the transmission of FIG. 1.
Figure 9:
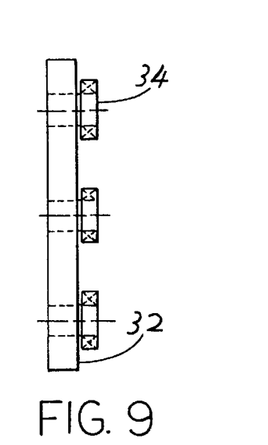
FIG. 9 is an end elevation view of the input wheel assembly of FIG. 8.

In FIG. 8, the diameter of the output wheel 40 along the circle of force 80 of the output wheel elements is 1.84 times the diameter of the circle of force 82 of the wheel rollers 34 of the input shaft. The net result is that the output shaft 12 turns at 54% of the rotational speed of the input shaft 10. Any ratio within a large range can be used.

Figure 10:
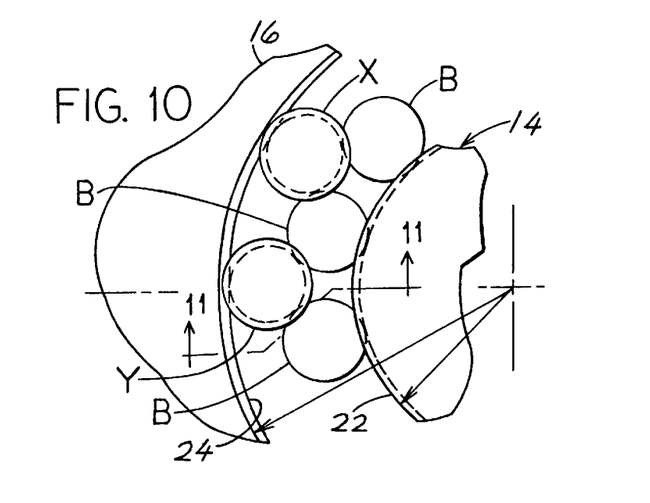
FIG. 10 is a partial front elevation view showing several rolling elements of the train of rolling elements of FIG. 1.
Figure 11:
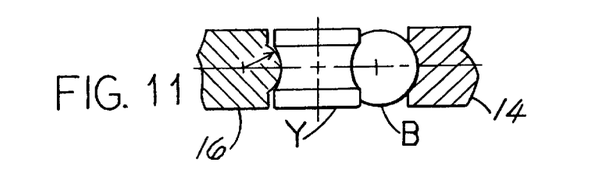
FIG. 11 is a sectional view taken on line 11—11 of FIG. 10.

FIGS. 10 and 11 show how the rolling elements X, Y, B roll on one another and along the tracks 22, 24. While the tracks 22, 24 are preferably (but not necessarily) about parallel to each other in most applications, some locations can lie closer together than others. It is only necessary that the distance between the tracks 22, 24 be greater than the diameters A (FIG. 4) of the roller elements X, Y, and that the separation be less than the diameter C of one of the inside grooves of a roller element X, Y plus the outside diameter C of the balls.

Figure 12:
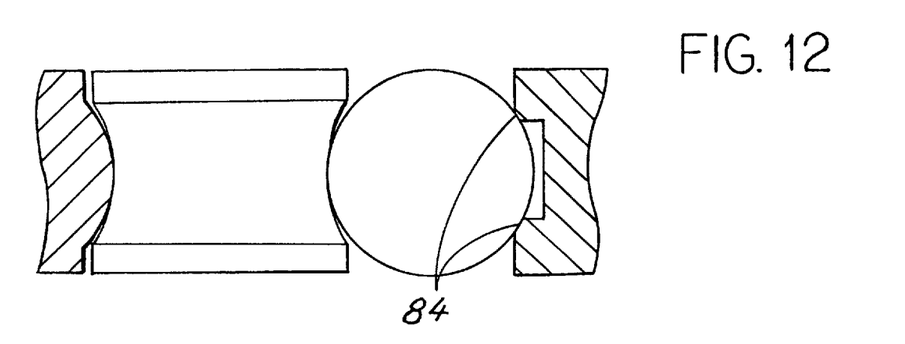
FIG. 12 is a sectional view of a guideway, along a curved portion thereof, in accordance with another embodiment of the invention.

It should be noted that along a curved portion of the guideway, special attention must be given to account for the fact that the balls B (FIG. 10) must match the surface velocity of the rollers. One solution is to construct the ball track with a special part 84 along the curve, as shown in FIG. 12.

Figure 13:
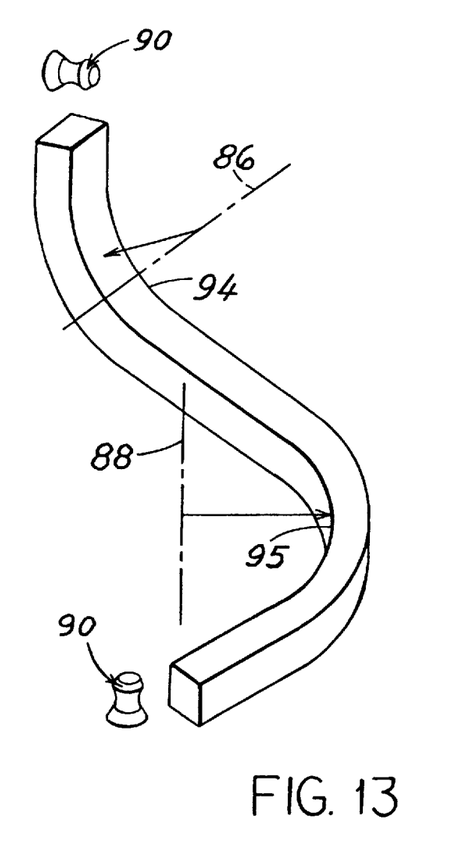
FIG. 13 is a sectional view of a portion of a guideway with ball and roller track sections that are curved about perpendicular axes, of another embodiment of the invention, and showing the orientation of rollers along the two sections.
Figure 14:
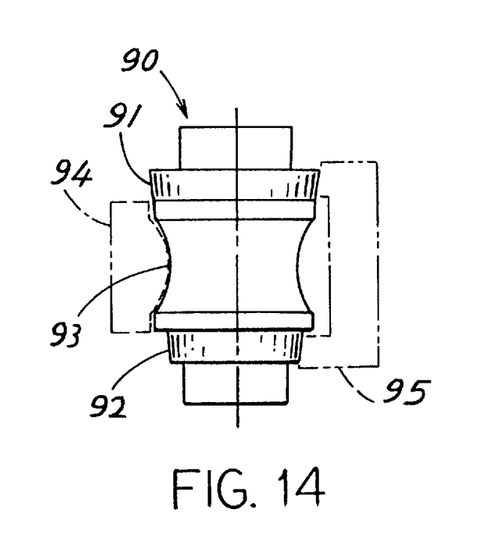
FIG. 14 is a sectional view of the guideway of FIG. 13 and of a conical roller used therein.

FIG. 13 shows a track portion that is curved about two perpendicular axes 86, 88. The rollers 90 have the shape shown in FIG. 14, with conical ends 91, 92 and a ball-engaging groove 93. The roller track section 94 extends along the curve 86 while the track section 95 extends along the curve 88.

In a transmission of the type illustrated in FIGS. 1–11 that applicant has designed, each of the balls B of FIG. 6 have a diameter D of 0.500 inch, and each of the rolling elements X, Y of FIGS. 4 and 5 have an outside diameter A along their sides 54, 56, 70, 72 of 0.562 inch. Each roller element had a groove 46 with a radius of curvature of 0.253 inch. The minor roller elements Y had an axial length G of 0.5 inch, while each of the main roller elements X had an axial length H of 1.0 inch. The radiuses of the input and output wheels of FIG. 8 at their lines of force 82, 80 were 1.578 inch and 2.906 inch, respectively. The input wheel elements 34 were angled 60° apart, while the output wheel elements 36 were angled by 30° from each other.

Figure 15:
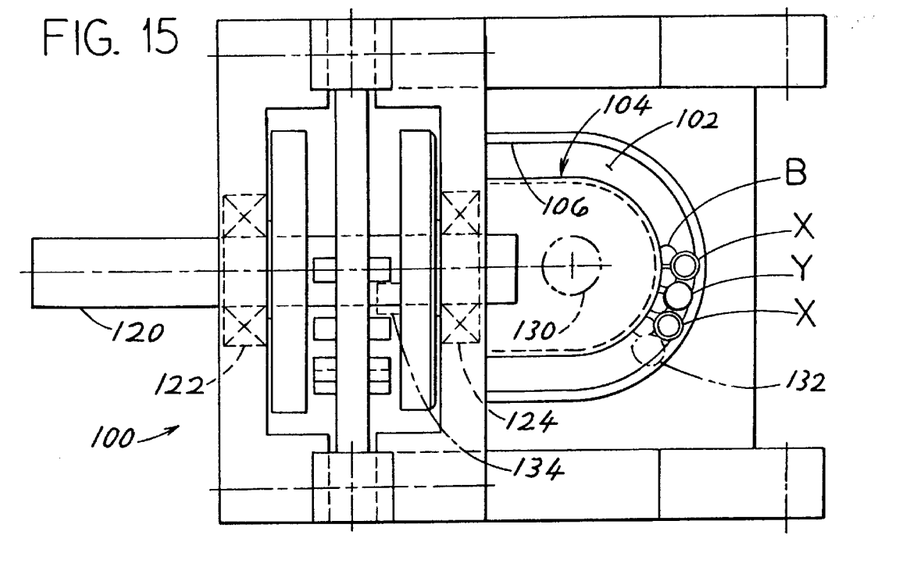
FIG. 15 is a side elevation view of a transmission constructed in accordance with another embodiment of the invention, wherein the input and output shafts extend at right angles to each other.
Figure 16:
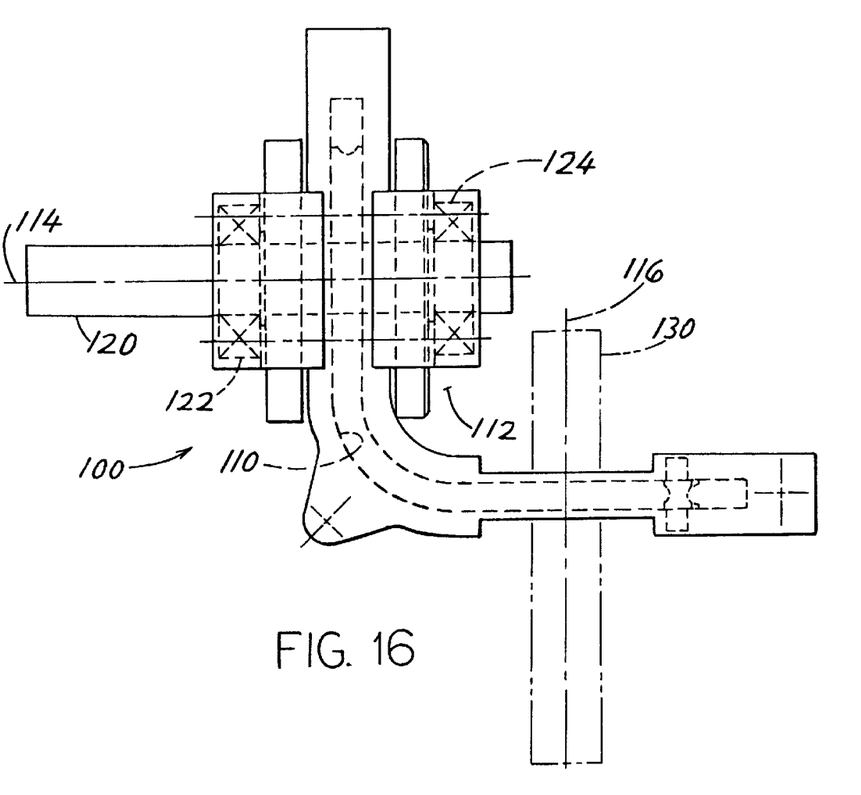
FIG. 16 is a plan view of the transmission of FIG. 12.

FIGS. 15 and 16 illustrate another transmission 100 which is similar to that of FIGS. 1–11 except that the guideway 102 and tracks 104, 106 have midsections 110 that are curved, such as about an axis 112 that is perpendicular to the axes 114, 116 of the input and output shafts 120, 130. The curvature shown in FIG. 16 is 90°, so this results in a right angle drive (almost any angle can be used). The radius of curvature about axis 112 is preferably large compared to the diameters of the track-guided elements X, Y, B. The figures show the input shaft 120 mounted on bearings 122, 124 of bearing blocks and show the track-guided elements X, Y and B which roll along the corresponding tracks. The input and output wheel and roller elements are not shown, although one of the output roller elements is indicated at 132 and one of the input roller elements is indicated at 134.

Figure 17:
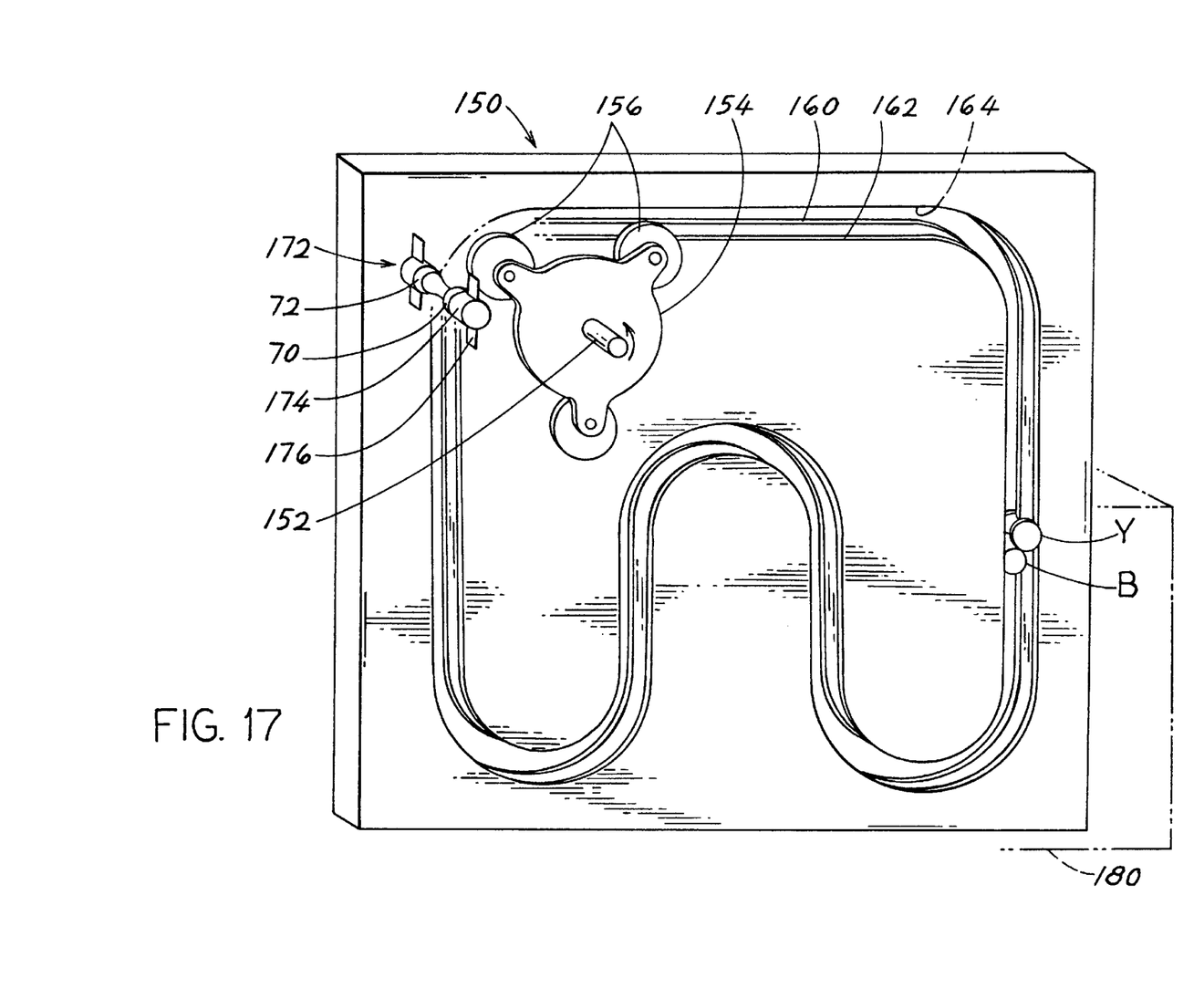
FIG. 17 is an isometric view of a transmission constructed in accordance with another embodiment of the invention.

The transmission of the present invention is also useful where the moving train of rolling elements can perform a function other than in driving an output shaft. FIG. 17 illustrates a transmission 150 which includes an input shaft 152 that turns an input wheel 154 that carries input wheel rollers 156. A gap or guideway 160 between a pair of tracks 162, 164, guides rolling elements similar to those shown at X, Y and B in FIGS. 1–11. However, the main rolling element 172 is modified from the main roller element of FIG. 4, in that element 172 has extensions 174 at its opposite ends, which carry mixing blades 176. Otherwise, the main rolling element 172 is identical to the element of FIG. 4, in that it rolls along one of the tracks 164 and it is pushed by the input wheel rollers 156. The other rolling elements Y and B are of the same construction as in FIGS. 5 and 6, respectively. The guideway 160 is designed to extend into a vessel indicated at 180 that holds fluid that is to be constantly stirred or agitated. As the rolling elements 172, Y, B move along the guideway 160, the blades or vanes 176 on the main elements 172 stir fluid everywhere along the guideway.

The transmission of the present invention can be used in a wide range of applications, as to drive one of a selected number of output shafts as by moving the output wheels associated with the different shafts into or out of position to engage the main roller elements, or by engaging or disengaging a clutch connected to each output shaft. As mentioned above, the movement of the train of rolling elements along the guideway can, itself, be useful as in stirring fluids or in providing an attractive display of multi-colored rolling elements which can be decorated to represent tumbling clowns, etc.

Thus, the invention provides a transmission which includes a train of rolling elements that move along a closed loop. The closed loop is formed by a frame having first and second largely parallel track extending in closed loop paths and with a gap between them that extends in a closed loop. A power input includes at least one pusher such as a wheel roller that engages particular ones of the rolling elements to push them along a limited length of the closed loop. The rolling elements include first rolling elements that roll against and along the first track and second rolling elements that roll against and along the second track. The first and second elements alternate along the gap and roll against each other, so the rolling elements can push one another along the closed loop while rolling along the tracks and along one another. Power from an input shaft can be transmitted to an output shaft that is connected to an output wheel that carries output wheel rollers that are positioned to be pushed by selected ones of the rolling elements. The rolling elements preferably include rollers that roll against one of the tracks and that have concave middles, and balls that roll against the other track and that roll against the concave middles of the rollers. The rollers can include main and secondary rollers, with one or more secondary rollers between every pair of main rollers. The main rollers have projections that are pushed by the pusher element, such as the input wheel rollers, and that can push the output wheel rollers. Other rolling element shapes can be used, such as only rollers. In some applications, the moving train of rolling elements themselves produce useful work, such as in stirring fluid.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A transmission comprising:
   a frame forming first and second largely parallel tracks extending in closed paths, with said tracks being spaced apart to form a closed loop between them;
   a plurality of rolling elements lying along said closed loop, including first rolling elements that roll against and along said first track and second rolling elements that roll against and along said second track, with said first and second rolling elements alternating along said gap and rolling against each other, so said rolling elements can push one another along said closed loop;
   a power input that includes an input shaft, an input wheel mounted on said input shaft, and a plurality of input wheel elements rotatably mounted on said input wheel and positioned to engage selected ones of said rolling elements to push them along said closed loop;
   said first rolling elements include main roller elements and minor roller elements that each roll along said first track, with said main roller elements having second end portions projecting by a sufficient distance to engage and be pushed by said input wheel elements, and with said minor roller elements having second end portions projecting by less than the second end portions of said main roller elements;
   said main and minor roller elements being interspersed along said gap, with at least one minor roller element lying between two sequential main roller elements.

2. A transmission, comprising:
   a frame forming first and second largely parallel tracks, with a gap between them, with said tracks and said gap extending in a closed loop;
   pluralities of first and second rolling elements, with said first rolling elements lying against said first track and said second rolling elements lying against said second track, and with said first and second rolling elements alternating along said gap with each first rolling element in rolling engagement with two of said second rolling elements and each second rolling element in rolling engagement with two of said first rolling elements;
   input and output shafts and input and output wheels mounted on said shafts, respectively, with said input wheel coupled to at least some of said rolling elements to push them along said gap, and with said output wheel coupled to at least some of said rolling elements to be turned by them;
   said first track has opposite first track sides and has a projection between said first track sides;
   said second track has opposite second track sides and has a recess between said second track sides which forms recess walls that are recessed from said second track sides;
   said first rolling elements have recesses that roll on said first track projection along at least part of the length of said first track;
   said second rolling elements are in the form of balls that lie partially in said recess of said second track and roll along said recess walls.

3. A transmission, comprising:
   a frame forming first and second largely parallel tracks, with a gap between them, with said tracks and said gap extending in a closed loop;
   pluralities of first and second rolling elements, with said first rolling elements lying against said first track and said second rolling elements lying against said second track, and with said first and second rolling elements alternating along said gap with each first rolling element in rolling engagement with two of said second rolling elements and each second rolling element in rolling engagement with two of said first rolling elements;
   input and output shafts and input and output wheels mounted on said shafts, respectively, with said input wheel coupled to at least some of said rolling elements to push them along said gap, and with said output wheel coupled to at least some of said rolling elements to be turned by them;
   said first rolling elements have conical end portions, and said first track has a curved section with a conical cross-section.

4. A transmission comprising:

a frame forming first and second largely parallel tracks extending in closed paths, with said tracks being spaced apart to form a closed loop between them;

a plurality of rolling elements lying along said closed loop, including a first group of rolling elements that roll against and along said first track and a second group of rolling elements that roll against and along said second track, with rolling elements of said first and second groups alternating along said gap and rolling against each other, so said rolling elements can push one another along said closed loop;

an input shaft, an input wheel mounted on said input shaft to turn, and a plurality of input wheel rollers rotatably mounted on said input wheel about input wheel axes, with said input wheel rollers being positioned to engage rolling elements of said first group of rolling elements to push them along said first track;

the rolling elements of said first group have axes of rotation that move along an axes path portion while rolling along a portion of said first track, and said input wheel axes move primarily along said axes path portion as said input wheel turns so said input wheel axes overlap said first rolling elements when viewed along said input wheel axes.

5. A transmission comprising:

a frame forming first and second largely parallel tracks extending in closed paths, with said tracks being spaced apart to form a closed loop between them;

a plurality of rolling elements lying along said closed loop, including first rolling elements that roll against and along said first track and second rolling elements that roll against and along said second track, with rolling elements rolling against said first and second tracks alternating along said gap and rolling against each other, so said rolling elements can push one another along said closed loop;

a power input which includes at least one pusher that engages particular ones of said rolling elements to push them in a predetermined direction along said closed loop, along a limited length of said closed loop;

said first and second rolling elements are respectively roller elements with substantially cylindrical portions and ball elements.

* * * * *